United States Patent [19]
Kwan et al.

[11] 4,428,155
[45] Jan. 31, 1984

[54] RELEASABLE HINGE DEVICE FOR REMOVABLE PANELS

[75] Inventors: Gerald A. Kwan, Pasadena; John Lehne, Hacienda Heights; Ronald E. Wooten, Sunnymead, all of Calif.

[73] Assignee: Le Van Specialty Co., Inc., City of Industry, Calif.

[21] Appl. No.: 339,329

[22] Filed: Jan. 15, 1982

[51] Int. Cl.³ ............................................. E05C 21/02
[52] U.S. Cl. ....................................... 49/465; 296/218; 16/261
[58] Field of Search .................. 49/463, 465; 296/218; 16/270, 271, 272, 254, 261

[56] References Cited

U.S. PATENT DOCUMENTS 3,021,555  2/1962  Aogedal ................................. 16/261
4,226,052  10/1980  DeStepheno ....................... 296/218

FOREIGN PATENT DOCUMENTS 56-28015  3/1981  Japan .................................. 296/218
56-28017  3/1981  Japan .................................. 296/218

*Primary Examiner*—Kenneth Downey
*Attorney, Agent, or Firm*—Francis X. LoJacono

[57] ABSTRACT

A releasable hinge device for panels which are removably mounted to fixed frame structures, the device being designed more particularly for association with removable-type glass panels employed with vehicle sunroofs. A pair of such hinge devices is attached adjacent the leading edge of a panel, each device including a flexible hinge member having an extended pivotal tongue member arranged to be removably received in a retainer member that is secured within the fixed frame structure of the sunroof. Slidably mounted to the hinge member is a latch cover which, when placed in a latching mode, locks the tongue member to the retainer member. In order to remove the panel from the frame structure, the latch cover of each hinge device is slidably disengaged from the respective retainer members, whereby the panel is readily removed, thus allowing the opening defined by the frame structure to be relatively free from protruding obstructions.

12 Claims, 8 Drawing Figures

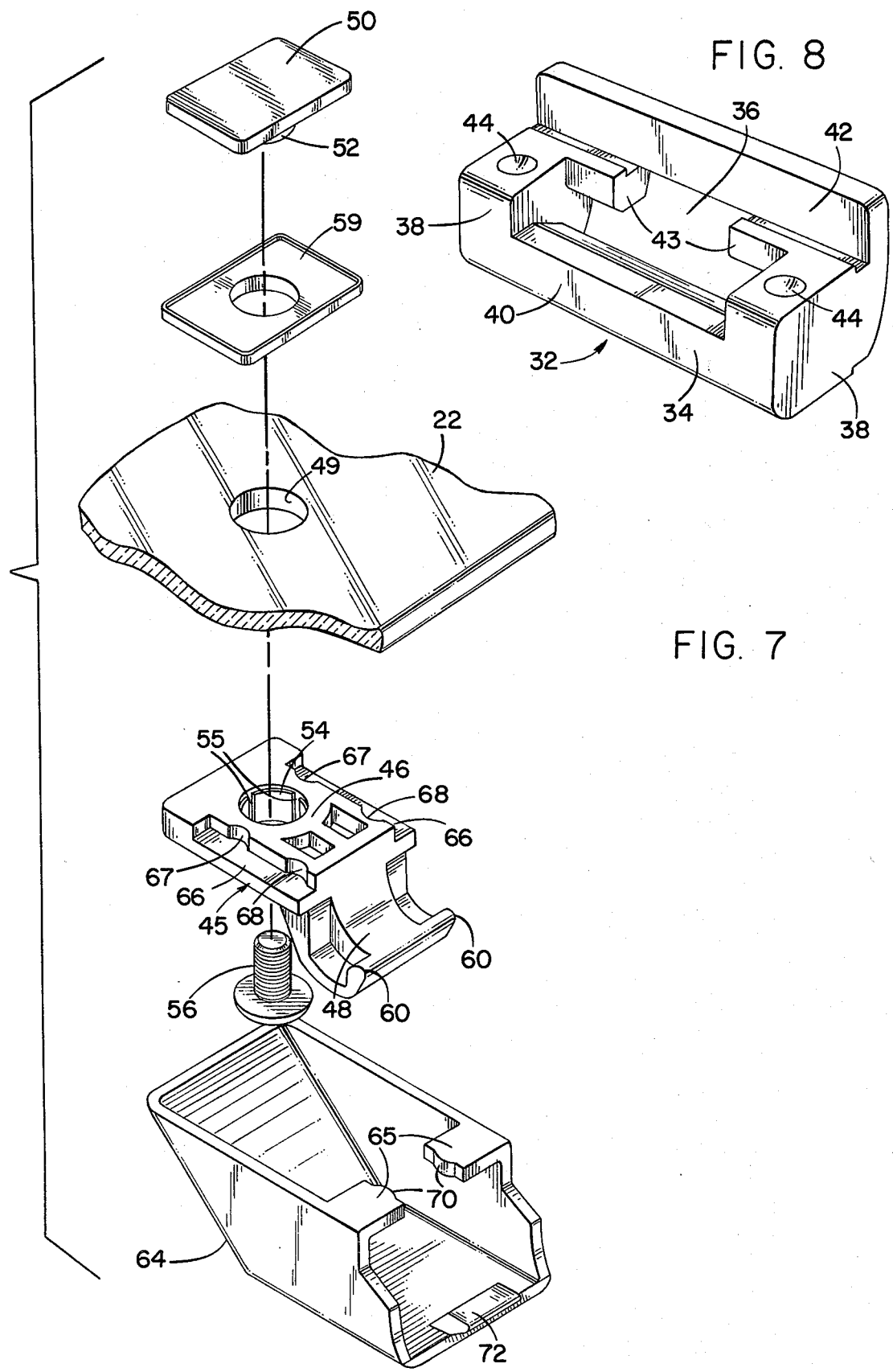

RELEASABLE HINGE DEVICE FOR REMOVABLE PANELS

BACKGROUND OF THE INVENTION

1. Field of the Invention

This invention relates generally to a hinge mechanism, and more particularly to a quick-release hinge device to allow for a fast and simple means to remove hinged covers or panels of the type used with respect to hinge glass panels for sunroofs and the like.

2. Description of the Prior Art

There have been problems and difficulties encountered in attempting to provide suitable means for releasably hinging the various covers, panes and panels to their related structures—especially with respect to the glass panels associated with fixed frameworks such as found in sunroof devices mounted in vehicle roofs.

Several known types of disconnectable hinge units are presently employed with removable panels, but these devices have their own peculiar characteristics and limitations which have thus far prevented their universal application in the art. A particular area or field having problems associated with removable hinges is with the automobile roof vents, better known as sunroofs. These sunroofs are very often required not only to provide hinged panels or covers, but in addition to include hinge devices that allow for quick and safe removal of the panels.

Many of the known hinge devices are so designed as to include features that restrict their use. Some can be removed from their related frame structures, but they are so complicated that they cannot be readily reconnected with ease by the average individual. Other units are so designed that, when a panel is removed, various related elements of the hinge extend dangerously within the opening defined by the frame structure of the sunroof which is secured within the roof of the vehicle.

Further, because of their rigid hinging action, the known hinge devices presently in use have limited the design configurations of their related panels. That is, the hinging actions of these devices do not allow arcuate, leading, hinged edges to be formed on the panels, or to provide more positive sealing action between the peripheral edges of the panels and the sealing members of the frame structures.

As examples of quick-release-hinge devices, one may refer to U.S. Pat. No. 3,974,753 to Blomgren and U.S. Pat. No. 4,131,970 to LeVan.

SUMMARY OF THE INVENTION

The present invention has for an important object to provide a means to overcome the existing problems associated with hinges being employed with vehicle sunroof panels.

It is another object of the invention to provide a quick-release hinge device that comprises a hinge member having a flexible tongue which is secured directly to the glass panel, the hinge member being formed to slidably support a houing cover which is arranged to slide along the main body of the hinge member, so as to interlock with the hinge tongue within a hinge retainer, the hinge retainer being secured within an annular channel formed in the fixed framework of the sunroof, and the panel being removable from the frame structure by sliding the housing cover of each hinge out of the hinge retainer, thus freeing the hinge tongue so that it, too, can be readily removed from the retainer.

It is still another object of the invention to provide a hinge device of this character that includes a flexible tongue member capable of bending along its longitudinal axis, the tongue additionally being capable of twisting along its axis, thus allowing—for the first time—the peripheral edges of a panel to be formed having a curve or an arc.

It is a further object of the invention to provide a hinge device of this character that is capable of being operated by any individual, without the need for assistance from others or for special tools, and further no tool being required for engaging or disengaging the releasable hinge from the frame structure of the sunroof.

It is still a further object of the present invention to provide a quick-release-hinge device where, when the panel is separated or removed from the sunroof frame structure, there are no components projecting from the frame structure, either inwardly from the defined opening or downwardly therefrom—which would create a dangerous hazard to the occupants of the vehicle.

A further object of the invention is to provide a hinge device of this character that has relatively few operating parts, and that is easy to service and maintain.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 7 is an exploded-perspective view of the hinge device; and

FIG. 8 is a perspective view of one of the hinge-retainer members.

DESCRIPTION OF THE PREFERRED EMBODIMENT

Figure 1:
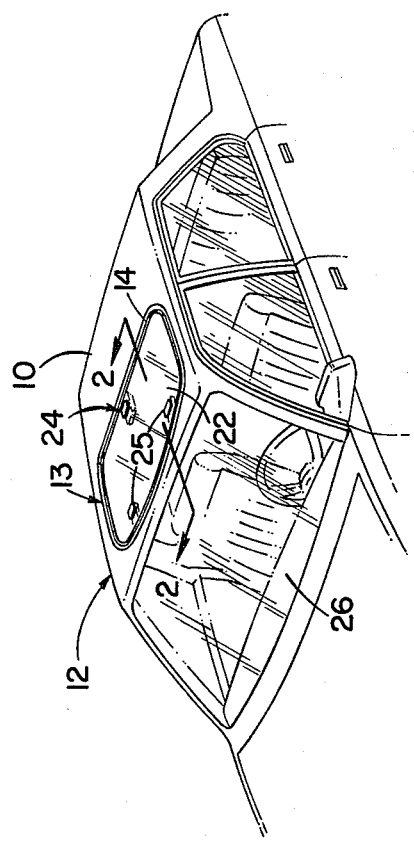
FIG. 1 is a pictorial view of a sunroof having a hinged glass panel and its associated frame structure mounted in the roof of a vehicle.
Figure 2:
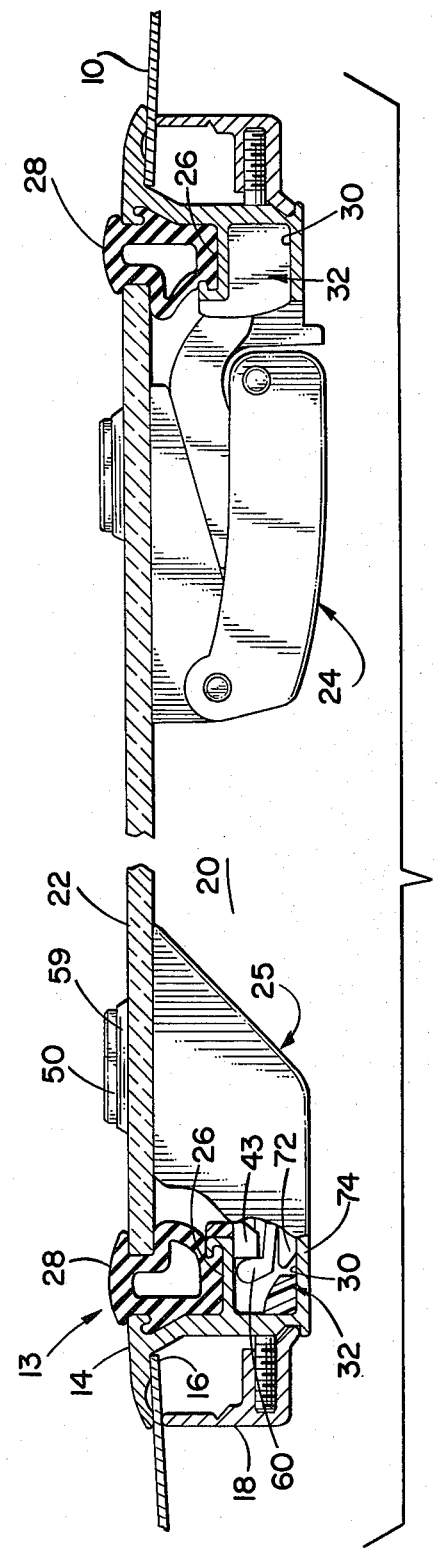
FIG. 2 is an enlarged cross-sectional view taken substantially along line 2—2 of FIG. 1, showing the releasable hinge in a secured position in cooperation with a typical handle and latch mechanism, the panel being locked in a closed position.

Referring more particularly to FIG 1, there is shown a roof portion 10 of a vehicle, generally indicated at 12, having a sunroof, designated at 13, mounted within the roof structure 10. The sunroof is generally defined by a fixed frame structure 14 mounted within opening 16 formed in roof 10. Frame structure 14 is fixedly secured to the peripheral edge of opening 16 in a suitable manner, indicated by an annular clamping ring 18 illustrated in FIG. 2, the frame structure 14 defining an access opening 20 which is closed by glass panel 22. Panel 22 is locked in the closed mode by a releasable latch handle, indicated generally at 24, which can be any suitable type compatible with the quick-release-hinge device, indicated at 25.

It is well understood that such panels as 22, illustrated in FIG. 1, are normally provided with a single latch handle 24 which is centrally positioned along the trailing edge of the panel, so as to cooperate with a pair of oppositely positioned hinge devices, designated at 25.

Thus, frame structure 14 is formed with an upper channel 26 adapted to receive a sealing member 28 therein for peripheral engagement with panel 22, when the panel is in a closed sealed position as illustrated herein. The frame structure 14 further includes a second, lower, peripheral channel 30 which is arranged to receive a coupling means defined by hinge retainer 32 so as to be secured therein. A respective hinge retainer is provided which is positioned to releasably couple with hinge device 25. Each hinge retainer is formed having a main body 34 with an elongated opening 36 defined by opposing end walls 38 interconnected by a rear strut member 40 and a front flange member 42. Integrally formed as part of side walls 38 and front flange member 42 is a pair of oppositely disposed coupling bars 43 adapted to receive the hinge tongue of the hinge device 25, which will hereinafter be described in detail. The upper and lower surfaces of each wall 38 include detents 44, the detents being located to receive corresponding projections formed within channel 30, thereby securing each retainer in its proper position for engagement with the respective hinge devices.

Accordingly, each hinge device comprises a hinge member, indicated at 45, having a main body member 46 and an extending hinge tongue 48. The hinge member 45 is secured to the glass panel 22 by a nut-and-bolt arrangement received through a hole 49 formed in panel 22. The nut is formed like a flat cap, indicated at 50, having a threaded depending head member 52 adapted to be received in bore 54 disposed in main body 46, bore 54 having a plurality of grooves 55 to mate with head member 52, in order to prevent rotation of nut 50 when bolt 56 is tightened therein. Bore 54 is also provided with an enlarged counter bore 58 to receive the head of bolt 56. Interposed between nut 50 and panel 22 is a washer or spacer 59.

Figure 3:
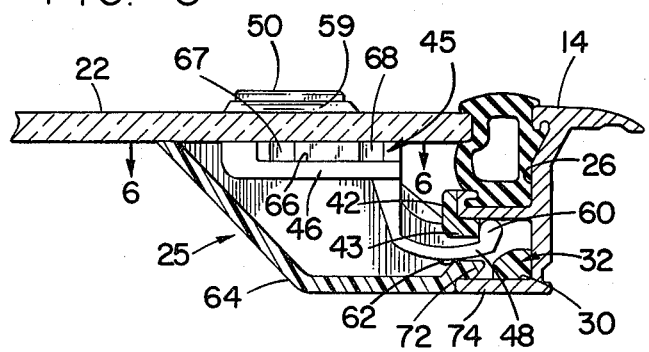
FIG. 3 is a cross-sectional view of the hinge device attached to the frame structure, the housing cover being in a secured position.
Figure 4:
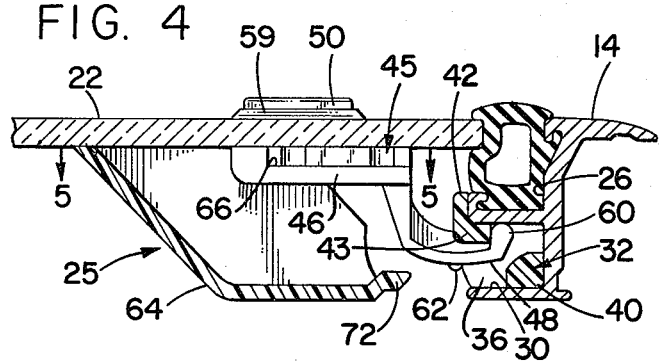
FIG. 4 is a cross-sectional view of the hinge device, showing the hinge-tongue member located within the hinge-retainer member and the housing cover disengaged from the hinge retainer, whereby the tongue member can be freely removed therefrom.
Figure 5:
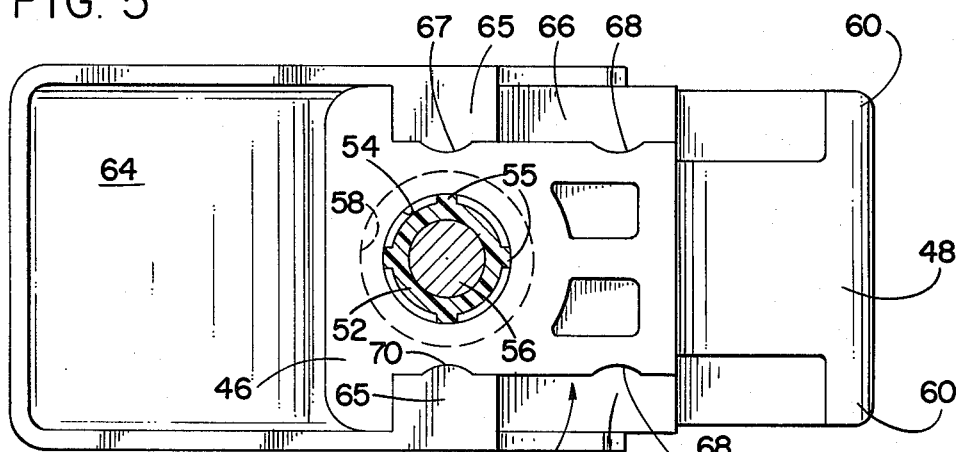
FIG. 5 is a cross-sectional view taken substantially along line 5—5 of FIG. 4.
Figure 6:
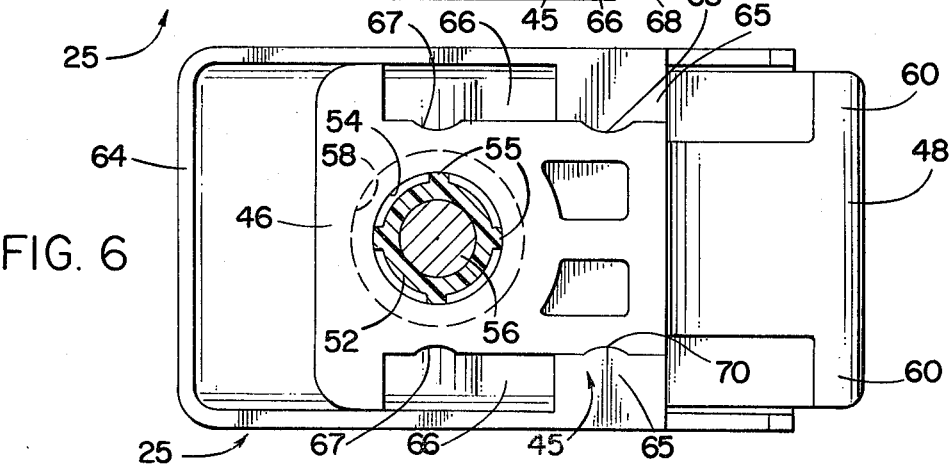
FIG. 6 is a cross-sectional view taken substantially along line 6—6 of FIG. 3.

Hinge member 45 is to be suitably formed from a hard yet flexible plastic material that will allow tongue 48 to flex—not only in its normal bending mode, but will also allow the tongue to bend laterally and twist when the panel is moved between an open and a closed mode. The flexing between the main body 46 and tongue 48 provides a dual action, allowing the leading edge of the sunroof and the panel to be formed in an arcuate configuration—which has not been possible in the past. The tongue 48 includes oppositely arranged keeper members 60, so that when tongue 48 is inserted into retainer 32 each keeper couples behind the respective coupling bar, as seen in FIGS. 3 and 4. In this position, catch 62 formed on the bottom of tongue 48 is positioned adjacent opening 36, as seen in FIG. 4.

Slidably mounted on hinge member 45 is a housing latch 64 which includes a pair of oppositely positioned each members 65 which extend inwardly so as to be slidably received in longitudinal grooves 66 formed in main body 46 of the hinge 45. A first and a second pair of recesses 67 and 68 are provided with a projecting member 70 formed to match recesses 67 and 68. Hence, when the hinge device is in a release mode, housing latch 64 is pulled back, whereby ears 65 are engaged in the respective recesses 67. In this position, tongue 48 can either be inserted into retainer 32 or readily removed. However, in order to lock tongue 48 into retainer 32, the tongue is inserted into the retainer, as seen in FIG. 4; and then housing latch 64 is moved forwardly—thus allowing ears 65 to engage the forward recesses 68 of hinge body 46. At this time, locking lug 72 is forced under catch 62 and wedged between catch 62 and the lower wall 74 which defines channel 30, as illustrated in FIG. 3. Thus, tongue 48 is coupled within retainer 32, but it is flexible enough to geniculate as panel 22 is raised to an open mode by latch hand 24; and it is capable at the same time of twisting along its axis to prevent any binding action from occurring.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and we do not wish to be restricted to the specific form shown or uses mentioned, except as defined in the accompanying claims.

We claim:

1. In combination, a quick-release-hinge device adapted to be releasably coupled between a fixed frame structure of a sunroof for vehicles and the movable closure panel therefor, wherein said frame structure includes a peripheral sealing member, said combination comprising:
   a fixed frame structure defining an opening and including a peripheral channel disposed therein;
   a movable closure panel hingedly attached to said frame structure;
   a releasable hinge member secured to the underside of said panel, said hinge member having a hinge body and an extended flexible tongue member adapted to bend and twist along the length thereof;
   a coupling means mounted in said peripheral channel of said frame structure and adapted to releasably receive said flexible tongue member therein; and
   means slidably mounted to said hinge body to lockingly engage said tongue within said coupling means.

2. The combination as recited in claim 1, including means for securing said hinge member to said closure panel; and wherein said hinge body thereof includes a pair of oppositely formed longitudinal grooves which include a first and a second pair of recesses, whereby said lock-engaging means is movable between a locked and an unlocked position.

3. The combination as recited in claim 2, wherein said lock-engaging means comprises a housing latch having a pair of inwardly projecting ear members adapted to be received in said longitudinal grooves of said hinge body.

4. The combination as recited in claim 3, wherein said ear members include means adapted to be received in the respective recesses in said longitudinal grooves.

5. The combination as recited in claim 1, including means for securing said hinge member to said closure panel; and wherein said hinge body includes a central bore to receive said securing means.

6. The combination as recited in claim 1, wherein said lock-engaging means comprises a housing latch slidably mounted to said hinge body, and includes a locking-lug member positioned to be interposed between said tongue member and said frame structure.

7. The combination as recited in claim 6, wherein said tongue member includes a pair of keeper members adapted to be received within said coupling means, and includes a catch member formed on the bottom of said tongue positioned to engage said locking lug, in order to prevent disengagement of said tongue from said coupling means when said hinge member is connected to said frame structure.

8. The combination as recited in claim 7, wherein said coupling means comprises a retainer member secured to said frame structure and recessed therein, said retainer member having a slot therein and a pair of oppositely disposed coupling bars adapted lto engage said tongue member hingedly connecting said hinge device to said frame structure.

9. The combination as recited in claim 8, wherein said frame structure includes at least one peripheral channel adapted to receive said retainer member.

10. The combination as recited in claim 9, wherein said hinge body includes a pair of oppositely disposed longitudinal grooves which include first and second pairs of recesses; and wherein said housing latch includes a pair of oppositely disposed ear members adapted to be slidably mounted in said respective longitudinal grooves of said hinge body, whereby said housing latch can be moved between a locked and an unlocked position.

11. The combination as recited in claim 10, wherein said hinge member is formed from a flexible plastic material to allow said tongue member to hingedly bend and laterally twist relative to said closure panel and said frame structure.

12. The combination as recited in claim 9, including means for securing said retainer member to said peripheral channel of said frame structure.

* * * * *